US012415272B2

(12) United States Patent
Takahashi et al.

(10) Patent No.: US 12,415,272 B2
(45) Date of Patent: Sep. 16, 2025

(54) TEACHING DEVICE

(71) Applicant: FANUC CORPORATION, Yamanashi (JP)

(72) Inventors: Yuutarou Takahashi, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 117 days.

(21) Appl. No.: 18/553,201

(22) PCT Filed: May 31, 2021

(86) PCT No.: PCT/JP2021/020728
§ 371 (c)(1),
(2) Date: Sep. 29, 2023

(87) PCT Pub. No.: WO2022/254543
PCT Pub. Date: Dec. 8, 2022

(65) Prior Publication Data
US 2024/0165801 A1 May 23, 2024

(51) Int. Cl.
*G06F 16/9538* (2019.01)
*B25J 9/00* (2006.01)
*B25J 9/16* (2006.01)

(52) U.S. Cl.
CPC ........... *B25J 9/1656* (2013.01); *B25J 9/0081* (2013.01)

(58) Field of Classification Search
CPC .... G06F 16/248; G06F 16/9577; G06F 9/445; G06F 9/50; B25J 9/1656; B25J 9/0081
See application file for complete search history.

(56) References Cited

U.S. PATENT DOCUMENTS

| | | | | |
|---|---|---|---|---|
| 5,341,458 A | * | 8/1994 | Kaneko | G05B 19/425 901/3 |
| 6,522,949 B1 | * | 2/2003 | Ikeda | G05B 19/425 700/262 |
| 10,300,609 B2 | * | 5/2019 | Jackowski | H02K 11/215 |
| 2005/0065990 A1 | * | 3/2005 | Allen | G06F 9/45504 708/495 |
| 2011/0153076 A1 | * | 6/2011 | Noro | B25J 9/1664 700/245 |

FOREIGN PATENT DOCUMENTS

| | | |
|---|---|---|
| JP | 2001-088068 A | 4/2001 |
| JP | 2007-242054 A | 9/2007 |
| JP | 4673058 B2 | 4/2011 |
| JP | 5271344 B2 | 8/2013 |
| JP | 6498366 B1 | 4/2019 |

* cited by examiner

*Primary Examiner* — Dalena Tran
(74) *Attorney, Agent, or Firm* — HAUPTMAN HAM, LLP

(57) ABSTRACT

A teaching device for creating a program using icons representing functions that form a control program for an industrial machine, the teaching device being provided with: a screen display generation unit that generates a program creation screen which has a predetermined region for arranging multiple icons to create a control program; and a relationship display generation unit that, on the basis of information related to multiple icons, extracts two or more icons which are related to each other in terms of processing contents from among the multiple icons arranged on the predetermined region, and displays the relationships between the extracted two or more icons so as to be visibly recognized.

10 Claims, 14 Drawing Sheets

TEACHING DEVICE

RELATED APPLICATIONS

The present application is a National Phase of International Application No. PCT/JP2021/020728 filed May 31, 2021.

FIELD

The present invention relates to a teaching device.

BACKGROUND

A teaching device that can perform programming using an icon representing each command of robot control in order to support an intuitive input by an operator of a control program of a robot is proposed (for example, PTL 1).

It should be noted that, in regard to a display system for performing display for supporting a series of pieces of work related to an industrial system, PTLs 2 and 3 describe a configuration for "providing a superior icon group display region 320, a subordinate icon group display region 322, an alternative figure display region 324, a processing content display region 326, and a tag instruction figure display region 328 on a display screen 312 of a display device 300 in a printed-circuit board work system" (paragraph 0030 in PTL 2 and paragraph 0031 in PTL 3).

CITATION LIST

Patent Literature

[PTL 1] Japanese Patent No. 6498366B
[PTL 2] Japanese Patent No. 4673058B
[PTL 3] Japanese Patent No. 5271344B

Technical Problem

SUMMARY

In a programming device using an icon, an operator creates a control program by arranging a desired icon in a processing order in a program creation region and performing parameter setting on an icon as necessary. Herein, the control program is realized by a mutual connection between pieces of processing by many icons. However, each of icons arranged in the program creation region is generally displayed in a completed manner with one icon. The operator often wishes to confirm a relationship between the icons.

Solution to Problem

One aspect of the present disclosure is a teaching device for performing program creation by an icon representing a function constituting a control program of an industrial machine, and the teaching device includes: a screen display creation unit that generates a program creation screen including a predetermined region for creating the control program by arranging a plurality of the icons: and a relationship display creation unit that extracts two or more icons having a mutual relationship with a processing content among the plurality of icons arranged in the predetermined region, based on information about each of the plurality of icons, and performs display in which the relationship between the two or more extracted icons can be visually recognized.

Advantageous Effects of Invention

According to the configuration described above, a relationship between icons arranged in a predetermined region of a program creation screen can be visually recognized, and creation of a program can efficiently proceed.

The objects, the features, and the advantages, and other objects, features, and advantages of the present invention will become more apparent from the detailed description of typical embodiments of the present invention illustrated in accompanying drawings.

DESCRIPTION OF EMBODIMENTS

Figure 1:
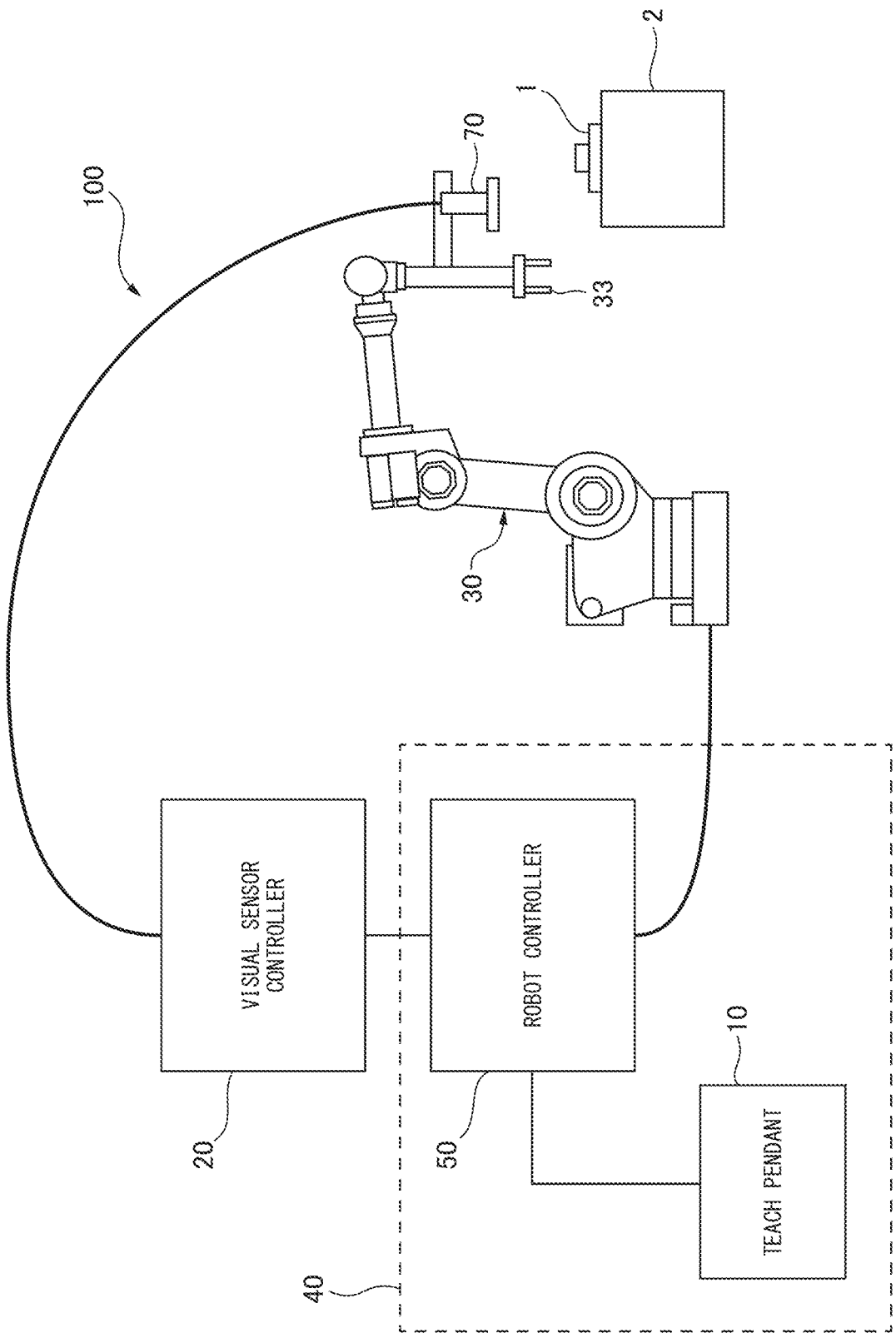
FIG. 1 is a diagram illustrating an overall configuration of a robot system including a teaching device according to one embodiment.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

FIG. 1 is a diagram illustrating an overall configuration of a robot system 100 including a teaching device 40 according to one embodiment. In the present embodiment, a robot controller 50 and a teach pendant 10 constitute the teaching device 40 for teaching a robot 30. The teaching device 40 is a teaching device that can perform programming using an icon representing a function constituting a control program of the robot 30 (i.e., representing a command of robot control). As described below in detail, the teaching device 40 makes programming work by a user efficient by displaying, in a visually recognizable manner, a mutual relationship between icons arranged in a program creation region of a program creation screen.

Various configuration examples are possible as a robot system including such a teaching device 40, but, in the present embodiment, the robot system 100 illustrated in FIG. 1 is assumed as an exemplification. The robot system 100 includes the robot 30 including a hand 33 mounted on an arm tip portion, the robot controller 50) that controls the robot 30, the teach pendant 10 connected to the robot controller 50, a visual sensor 70 attached to the arm tip portion of the robot 30, and a visual sensor controller 20 that controls the visual sensor 70. The robot system 100 can detect a target object 1 on a worktable 2 by the visual sensor 70, and can perform handling of the target object 1 with the hand 33 mounted on the robot 30.

The visual sensor controller 20 has a function of controlling the visual sensor 70 and a function of performing image processing on an image captured by the visual sensor 70. The visual sensor controller 20 detects a position of the target object 1 from the image captured by the visual sensor 70, and provides the detected position of the target object 1 to the robot controller 50. In this way, the robot controller 50 can correct a teaching position, and perform picking-up and the like of the target object 1. The visual sensor 70 may be a camera that captures a gray-scale image and a color image, or may be a stereo camera or a three-dimensional sensor that can acquire a distance image and a three-dimensional point group. In the robot system 100, a plurality of visual sensors may be arranged. The visual sensor controller 20 holds a model pattern of a target object, and performs image processing of detecting a target object by pattern matching between an image 20) of the target object in a captured image and the model pattern. It should be noted that, in FIG. 1, the visual sensor controller 20 is formed as a device separately from the robot controller 50, but a function as the visual sensor controller 20 may be mounted in the robot controller 50.

Figure 2:
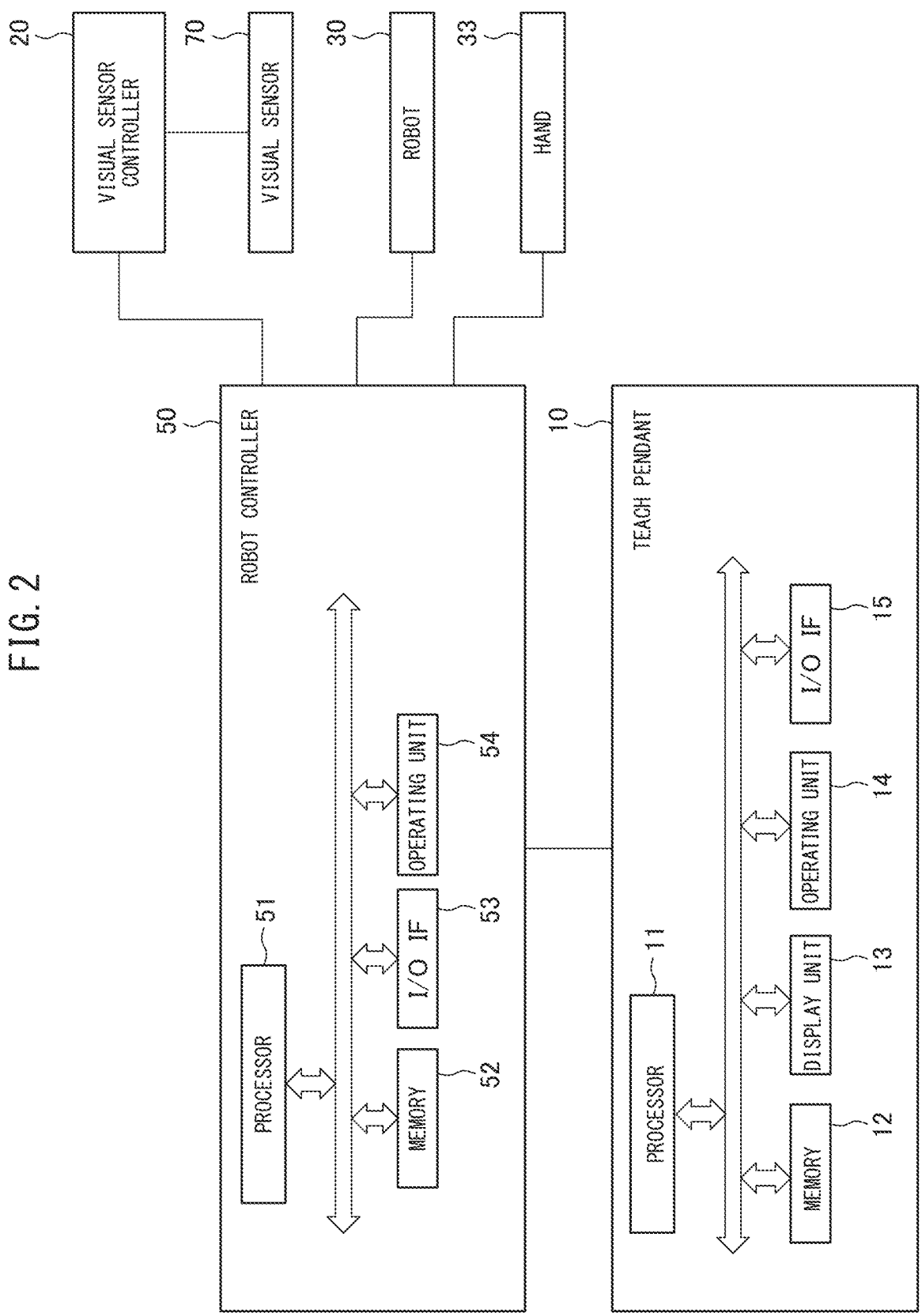
FIG. 2 is a diagram illustrating a hardware configuration example of a robot controller and a teach pendant.

FIG. 2 is a diagram illustrating a hardware configuration example of the robot controller 50 and the teach pendant 10. The robot controller 50 may have a configuration as a general computer in which a memory 52 (such as a ROM, a RAM, and a non-volatile memory), an input/output interface 53, an operating unit 54 including various operation switches, and the like are connected to a processor 51 via a bus. The teach pendant 10 is used as a device for performing an operation input and a screen display for teaching the robot 30 (i.e., creating a control program). The teach 30) pendant 10 may have a configuration as a general computer in which a memory 12 (such as a ROM, a RAM, and a non-volatile memory), a display unit 13, an operating unit 14 formed of an input device such as a keyboard (or a software key), an input/output interface 15, and the like are connected to a processor 11 via a bus. It should be noted that various information processing devices such as a tablet terminal, a smartphone, and a personal computer can be used instead of the teach pendant 10.

Figure 3:
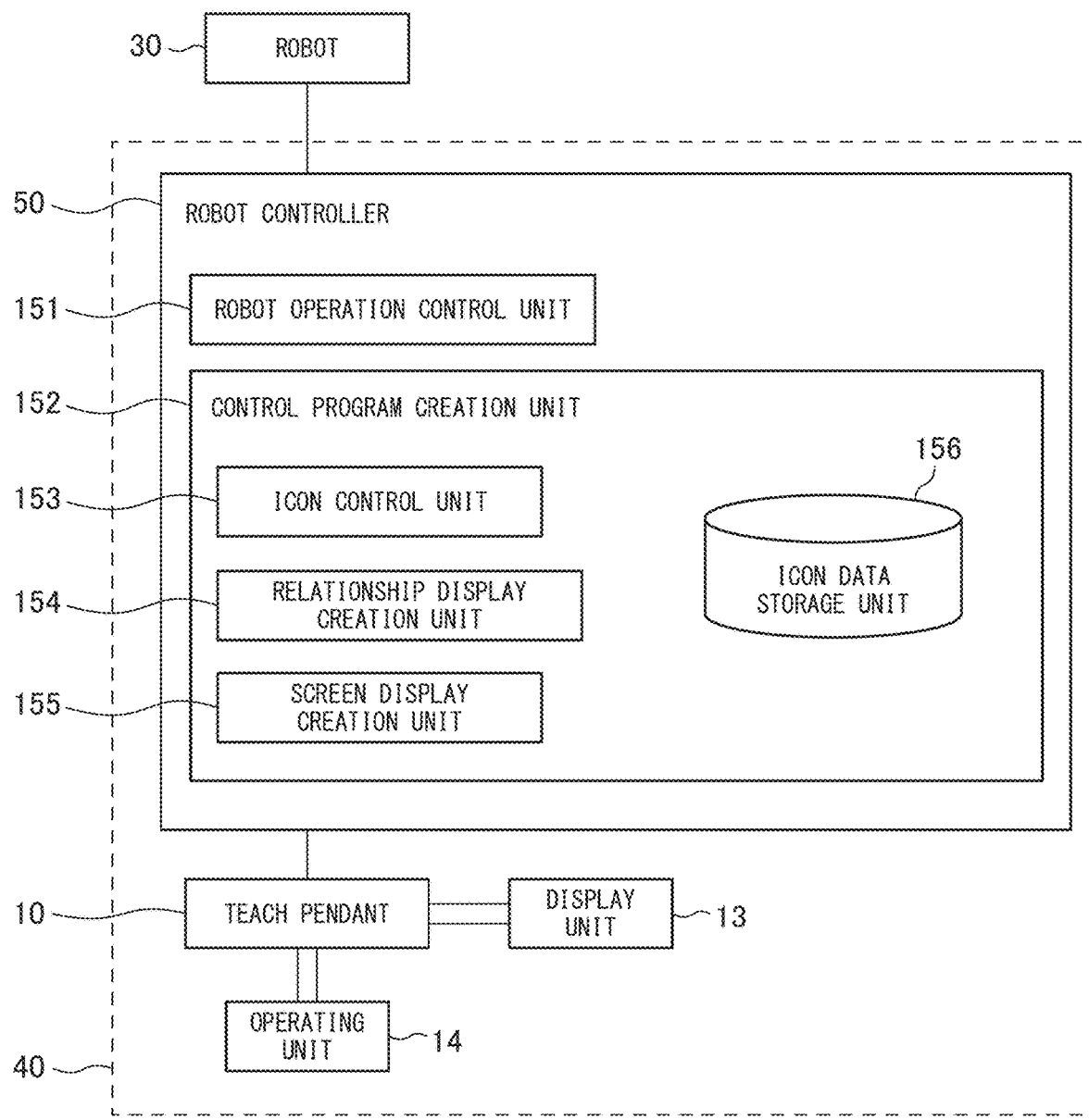
FIG. 3 is a functional block diagram of the robot controller and the teach pendant.

FIG. 3 is a functional block diagram illustrating a functional configuration of the teaching device 40 formed of the robot controller 50 and the teach pendant 10. As illustrated in FIG. 3, the robot controller 50 includes a robot operation control unit 151 and a control program creation unit 152.

The robot operation control unit 151 controls an operation of the robot 30 according to a control program or an operation input from the teach pendant 10.

The control program creation unit 152 provides various functions when a user operates the teach pendant 10 and performs programming using icons. The control program creation unit 152 includes, as components that provide such functions, an icon control unit 153, a relationship display creation unit 154, a screen display creation unit 155, and an icon data storage unit 156.

The icon data storage unit 156 stores various types of information about an icon such as data about a shape (image) of each icon and a setting parameter. The icon data storage unit 156 is formed in, for example, a non-volatile memory of the memory 52.

The screen display creation unit 155 generates various screens used for performing programming using icons, and displays the various screens on the display unit 13 of the teach pendant 10.

Figure 4:
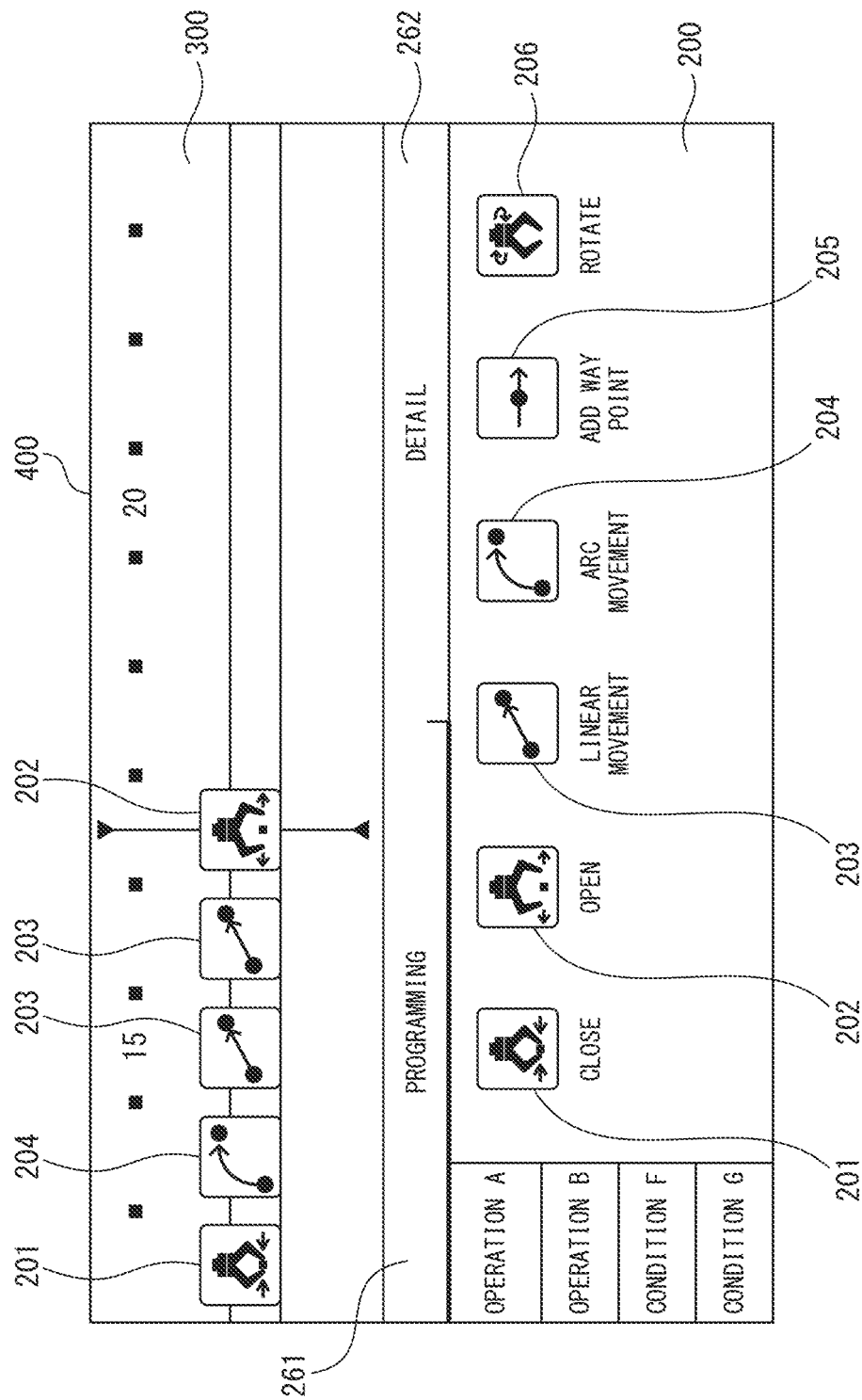
FIG. 4 is a diagram illustrating a configuration of a program creation screen.

FIG. 4 is an example of a program creation screen 400 created by the screen display creation unit 155 and displayed on the display unit 13 of the teach pendant 10. As illustrated in FIG. 4, the program creation screen 400 includes an icon display region 200 for displaying a list of various icons that can be used for programming, and a program creation region 300 for creating a control program by arranging the icons in an order. In the example in FIG. 4, the icon display region 200 includes a hand close icon 201 representing a command for closing a hand, a hand open icon 202 representing a command for opening the hand, a linear movement icon 203, an arc movement icon 204, a way point addition icon 205, and a rotation icon 206 that rotates the hand.

A user can select an icon by, for example, putting a cursor on the icon. The user performs programming by selecting a desired icon from the icon display region 200 and arranging the icon in the program creation region 300 by, for example, a drag-and-drop operation. In the example in FIG. 4, in the program creation region 300, the hand close icon 201, the arc movement icon 204, two linear movement icons 203, and the hand open icon 202 are arranged in order. When the number of icons arranged in the program creation region 300 increases, the user can arrange an icon by scrolling the screen in a horizontal direction.

In the program creation screen 400, the user selects a programming tab 261 when the user performs programming. Meanwhile, by selecting an icon in the program creation region 300 and selecting a detail tab 262, the user can open a detailed setting screen for performing detailed setting (parameter setting) on the icon. The user can execute a control program by performing a predetermined operation while icons are arranged in the program creation region 300.

The icon control unit 153 has control over a user operation when the user operates the operating unit 14 of the teach pendant 10 and performs various operations on an icon, a tab, and the like on the program creation screen 400. Under support by the icon control unit 153, the user successively selects a desired icon from a list of icons arranged in the icon display region 200, arranges the icon in the program creation region 300, and creates a control program. Further, by selecting an icon arranged in the program creation region 300 and selecting the detail tab 262 as necessary, the user can display a detailed setting screen and perform detailed setting on the selected icon.

The relationship display creation unit 154 extracts two or more icons having a mutual relationship in regard to processing contents among a plurality of icons arranged in the program creation region 300, based on information about each of the plurality of icons, and performs display in which the relationship between the two or more extracted icons can be visually recognized. Herein, presence of the relationship in the processing contents between the icons may include a relationship in various manners such as processing in cooperation, a common processing purpose, and a common processing target. With such a function by the relationship display creation unit 154, the user can visually instantly recognize a mutual relationship between icons arranged in the program creation region 300, and can efficiently proceed with programming.

As an exemplification, the relationship display creation unit 154 may determine that icons satisfying any of the following conditions (a1) and (a2) have a relationship.

(a1) Icons using the same data
(a2) Icons using the same hardware

Herein, the same data includes various types of data, such as, a register, a label or a variable that may be referred to in a control program.

Figure 5:
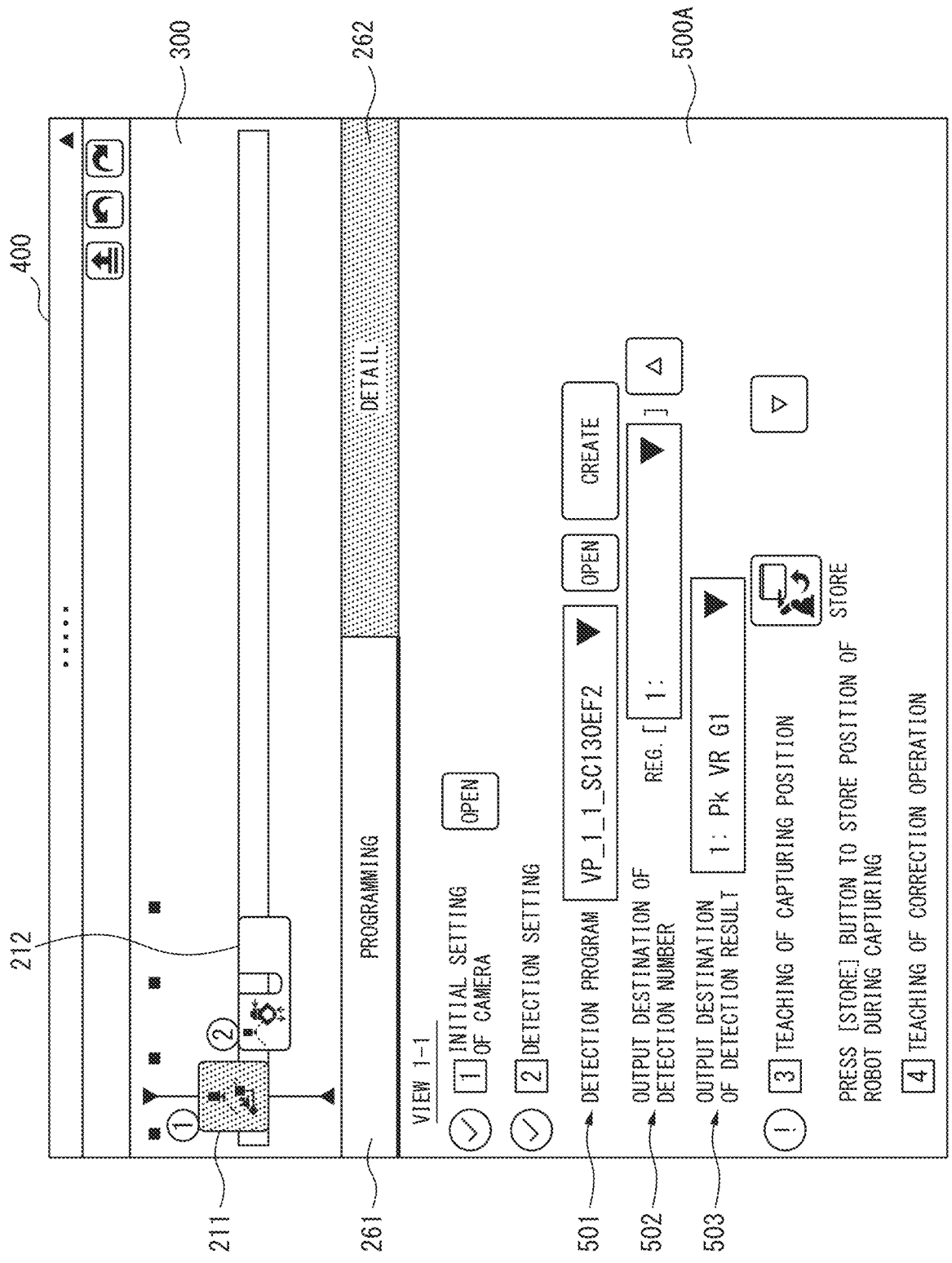
FIG. 5 is a diagram illustrating a detailed setting screen displayed on a lower portion of a screen when a detail tab is selected while a view icon is selected.
Figure 6:
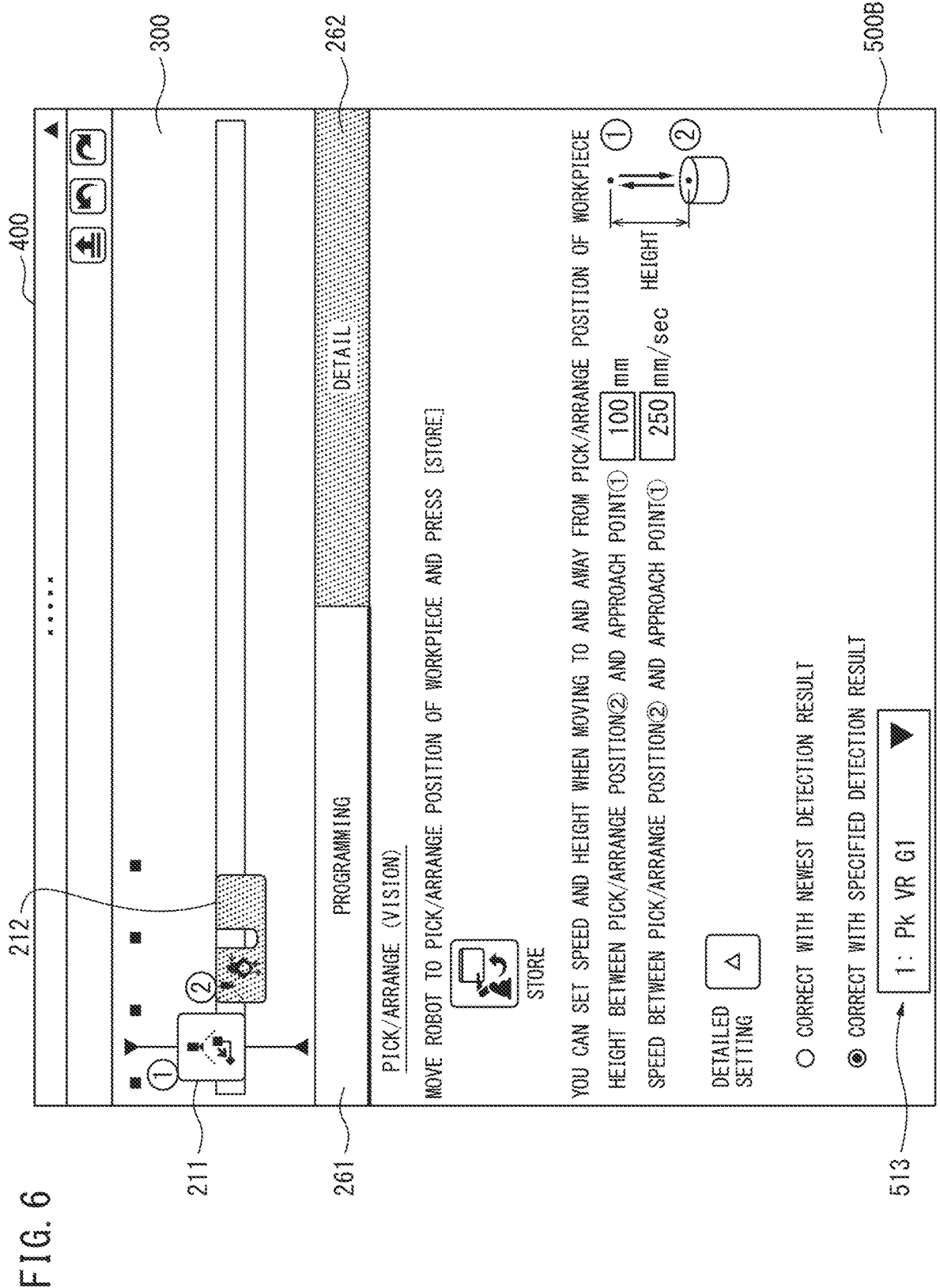
FIG. 6 is a diagram illustrating a detailed setting screen displayed on the lower portion of the screen when the detail tab is selected while a pick/arrange icon is selected.

With reference to FIGS. 5 and 6, a first operation example when icons using the same data are extracted as icons having a relationship is illustrated. Herein, as an exemplification of the icons using the same data, a view icon 211 and a pick/arrange icon 212 are adopted. It should be noted that FIGS. 5 and 6 illustrate, for convenience of description, a state where only the view icon 211 and the pick/arrange icon 212 are arranged in the program creation region 300, but actual programming normally includes many icons in the program creation region 300, and the view icon 211 and the pick/arrange icon 212 are arranged away from each other. Herein, the view icon 211 corresponds to a function of detecting a position of a target object by a visual detection function (function of detecting a position of a target object by using a visual sensor), and the pick/arrange icon 212 corresponds to a function of picking up or arranging the target object while performing correction of a teaching point by using the position of the target object detected by the visual detection function.

FIG. 5 illustrates a state where a detailed setting screen 500A of the view icon 211 is displayed on a lower portion of the screen by selecting the detail tab 262 while the view icon 211 is selected. FIG. 6 illustrates a state where a detailed setting screen 500B of the pick/arrange icon 212 is displayed on the lower portion of the screen by selecting the detail tab 262 while the pick/arrange icon 212 is selected.

As illustrated in FIG. 5, the detailed setting screen 500A of the view icon 211 includes "initial setting of camera", "detection setting", and "teaching of capturing position". The user sets the setting items as necessary. It should be noted that a default value may be set in advance in the setting items of the detailed setting screen. "Detection setting" includes a specification (reference sign 501) of a detection program name (macro name), a specification (reference sign 502) of a register of an output destination of a detection number, and a specification (reference sign 503) of a register of an output destination of a detection result (position information in which a target object is detected). In the example in FIG. 5, No. 1 of a vision register is specified as an output destination of a detection result. In the register that holds the detection result, position information about a target object detected by the visual detection function is stored.

As illustrated in FIG. 6, the detailed setting screen 500B of the pick/arrange icon 212 includes setting for teaching a position (teaching point) in which a target object is picked up or arranged, a specification of a height between the pick/arrange position and an approach point, a movement speed between the pick/arrange position and the approach point, and a specification (reference sign 513) of a register that holds a position of the target object being used when the position of the target object is corrected and a pick/arrange operation is performed. In the example in FIG. 6, No. 1 of a vision register is specified as a register used for correcting a position of a target object.

In this way, since the view icon 211 and the pick/arrange icon 212 refer to No. 1 of the vision register being the same register, the position information about the target object detected by the view icon 211 is used when a position of the target object is corrected in the pick/arrange icon 212. In this way, the view icon 211 and the pick/arrange icon 212 have a connection in regard to operation contents. The relationship display creation unit 154 refers to setting information about the view icon 211 and the pick/arrange icon 212, and determines that the icons mutually have a relationship since the icons refer to the same register as the register that holds the detection result. As described above, icons having a mutual connection in regard to processing contents are appropriately extracted.

Even in a situation where there are a plurality of pairs of view icons and pick/arrange icons in a program and register numbers of an output destination of a detection result are different among the plurality of pairs, each of the pairs of the view icon and the pick/arrange icon having a connection in regard to the processing can be appropriately extracted by the above-described technique for extracting icons using the same data as icons having a relationship.

Figure 7:
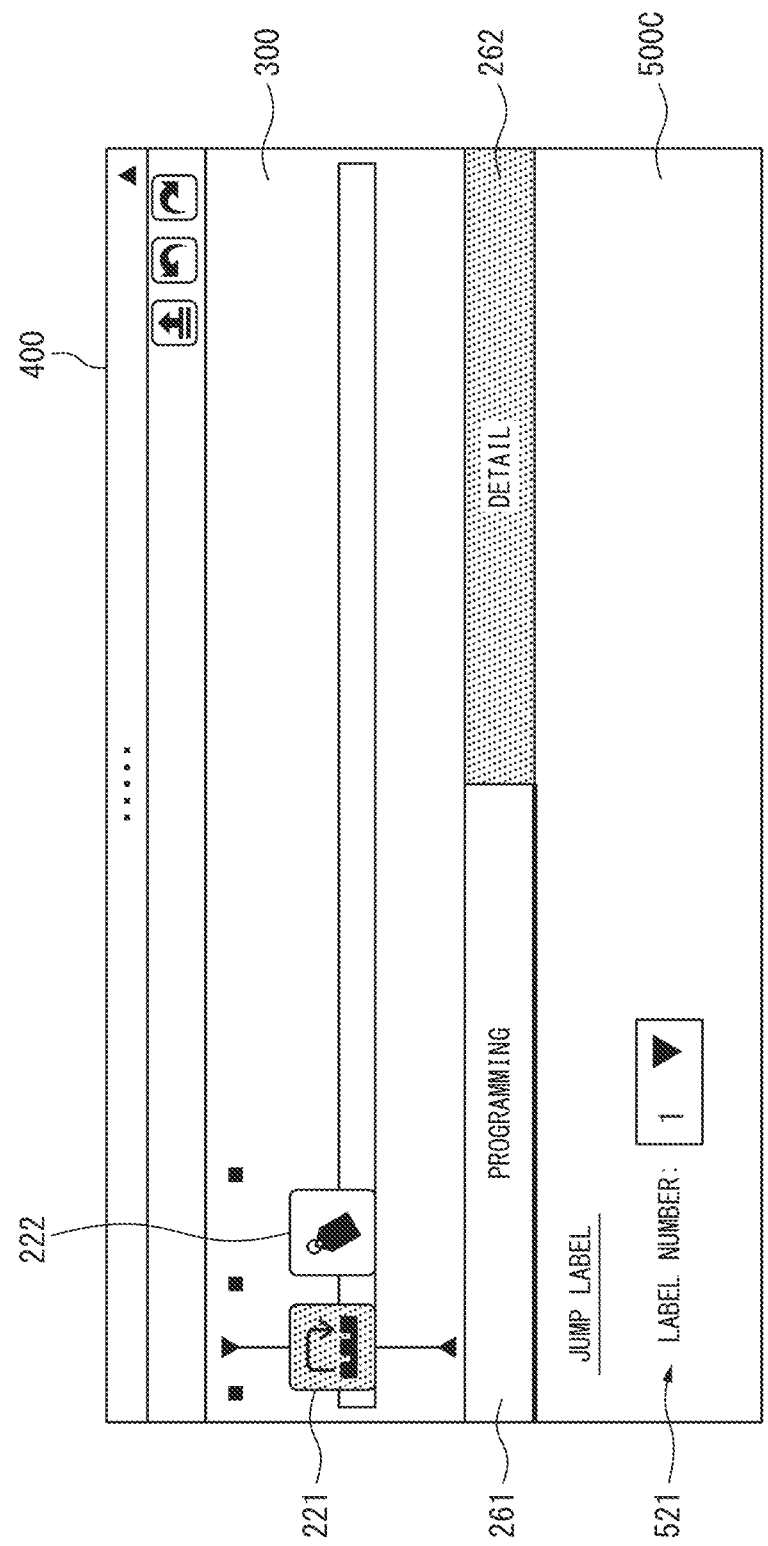
FIG. 7 is a diagram illustrating a detailed setting screen displayed on the lower portion of the screen when the detail tab is selected while a jump label icon is selected.
Figure 8:
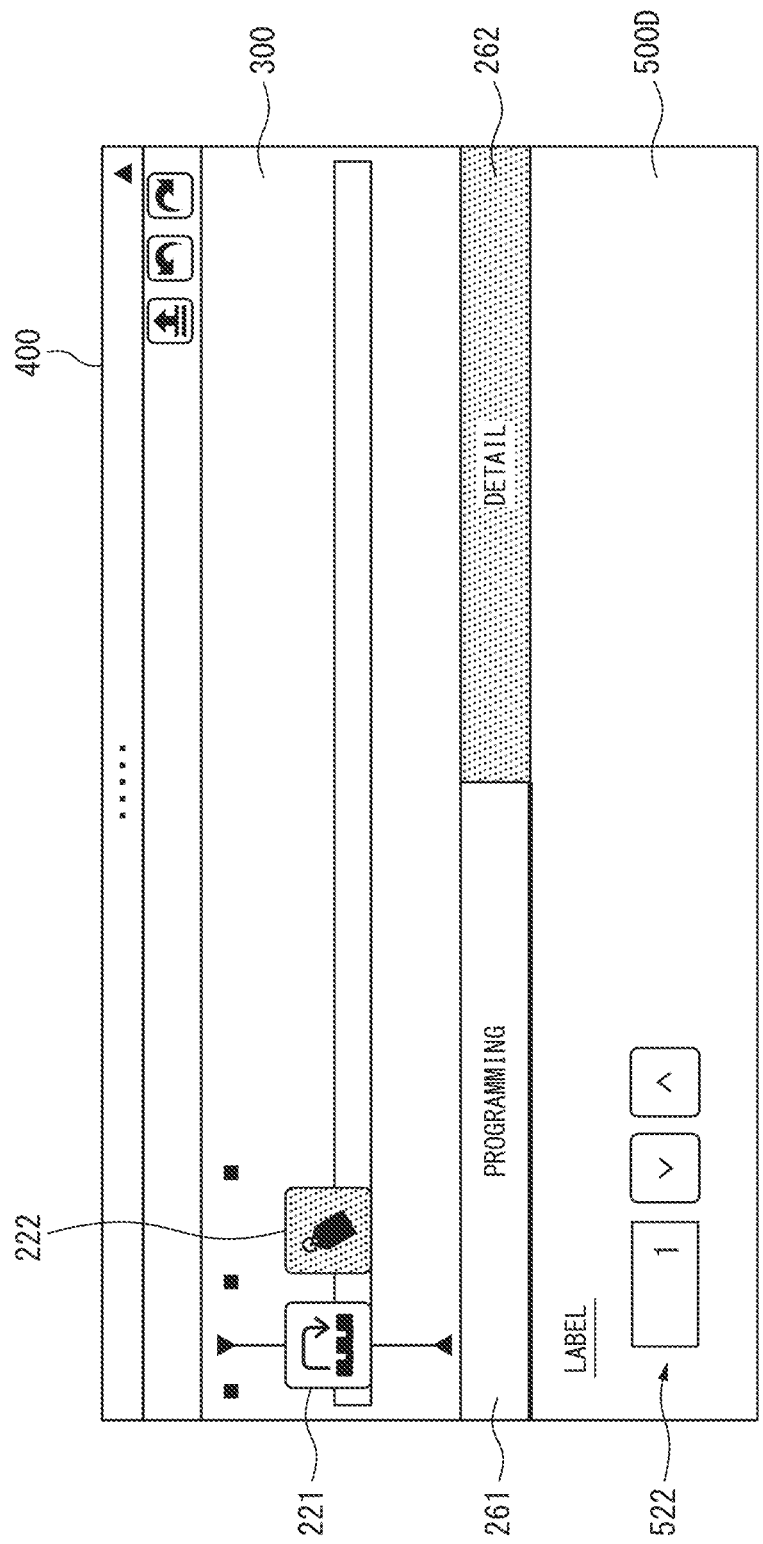
FIG. 8 is a diagram illustrating a detailed setting screen displayed on the lower portion of the screen when the detail tab is selected while a label icon is selected.

Next, with reference to FIGS. 7 and 8, a second operation example when icons using the same data are extracted as icons having a relationship is illustrated. Herein, as an exemplification of the icons using the same data, a jump label icon 221 and a label icon 222 are adopted. It should be noted that FIGS. 7 and 8 illustrate, for convenience of description, a state where only the jump label icon 221 and the label icon 222 are arranged in the program creation region 300, but actual programming normally includes many icons in the program creation region 300, and the jump label icon 221 and the label icon 222 are arranged away from each other. The jump label icon 221 is a command for jumping to a label with a number specified as a label number serving as a detailed setting parameter. The label icon 222 is an icon arranged at a jump destination of the jump label icon 221.

FIG. 7 illustrates a state where a detailed setting screen 500C of the jump label icon 221 is displayed on the lower portion of the screen by selecting the detail tab 262 while the jump label icon 221 arranged in the program creation region 300 is selected. FIG. 8 illustrates a state where a detailed setting screen 500D of the label icon 222 is displayed on the lower portion of the screen by selecting the detail tab 262 while the label icon 222 is selected.

As illustrated in FIG. 7, the jump label icon 221 includes a label number (reference sign 521) of a jump destination as a detailed setting parameter. Further, as illustrated in FIG. 8, the label icon 222 includes a label number (reference sign 522) as a detailed setting parameter. In the present example, the label number of the jump label icon 221 and the label number of the label icon 222 are common and "1". In other words, the jump label icon 221 and the label icon 222 use the same data (label number). Therefore, the jump destination of the jump label icon 221 is the label icon 222, and the icons have a connection in regard to the processing.

In this case, the relationship display creation unit 154 recognizes that the jump label icon 221 and the label icon 222 use the same data by referring to the label numbers of the icons as the detailed setting parameters, and determines that the icons have a relationship. In this way, icons having a mutual connection in regard to processing contents are appropriately extracted. In this way, by extracting the jump label icon being a jump source and the label icon being a jump destination and visually displaying a relationship between the icons, the user can instantly recognize the connection between the jump label icon 221 and the label icon 222 on the program creation screen 400, and can efficiently proceed with creation of a program.

It should be noted that, normally, a plurality of pairs of the jump label icon and the label icon having a common label number may intricately overlap each other in a program in some cases. Even in such a case, each of the pairs of the jump label icon and the label icon that are mutually related (that are a jump source and a jump destination) can be appropriately extracted by the above-described technique.

Figure 9:
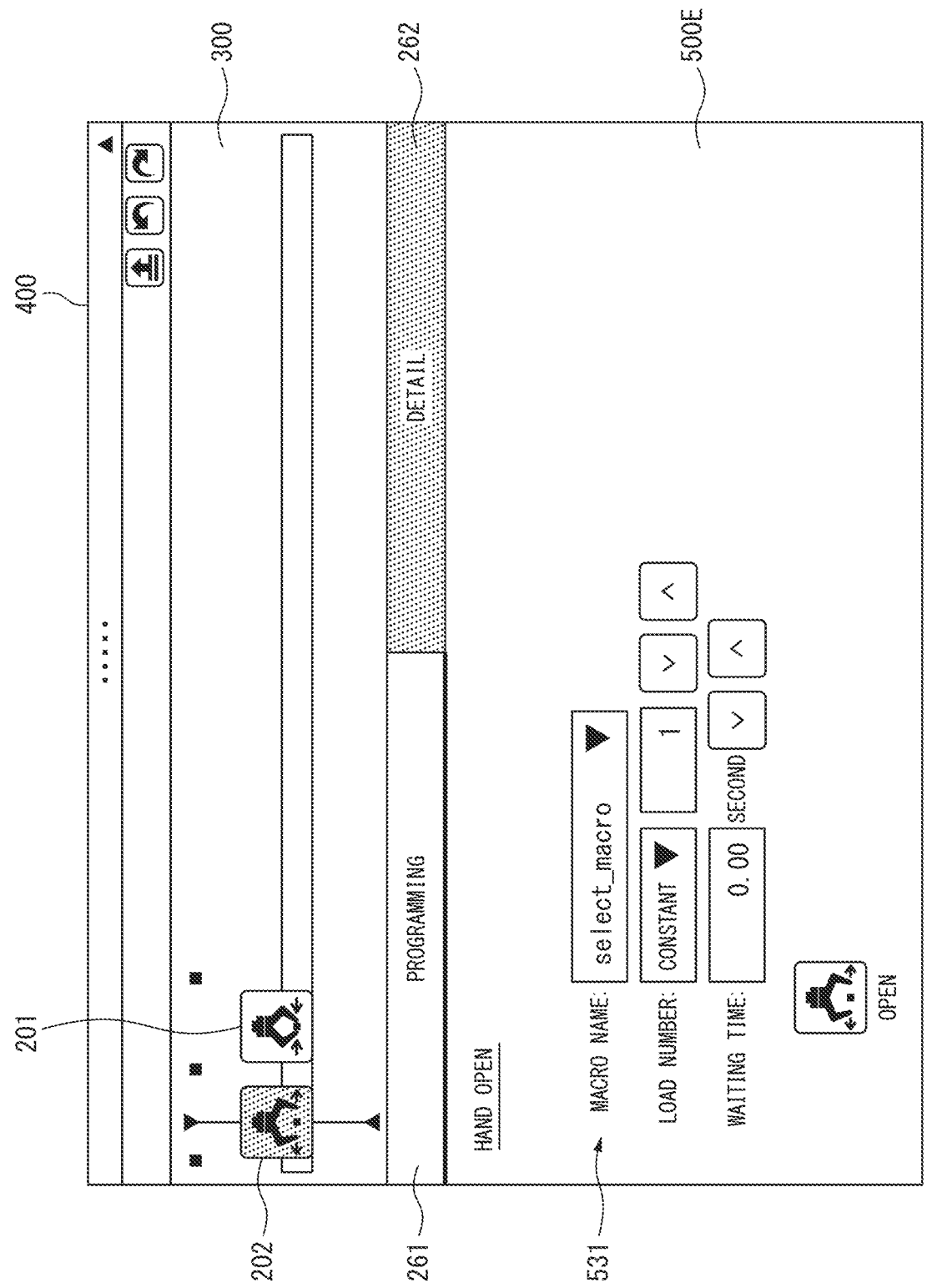
FIG. 9 is a diagram illustrating a detailed setting screen displayed on the lower portion of the screen when the detail tab is selected while a hand open icon is selected.
Figure 10:
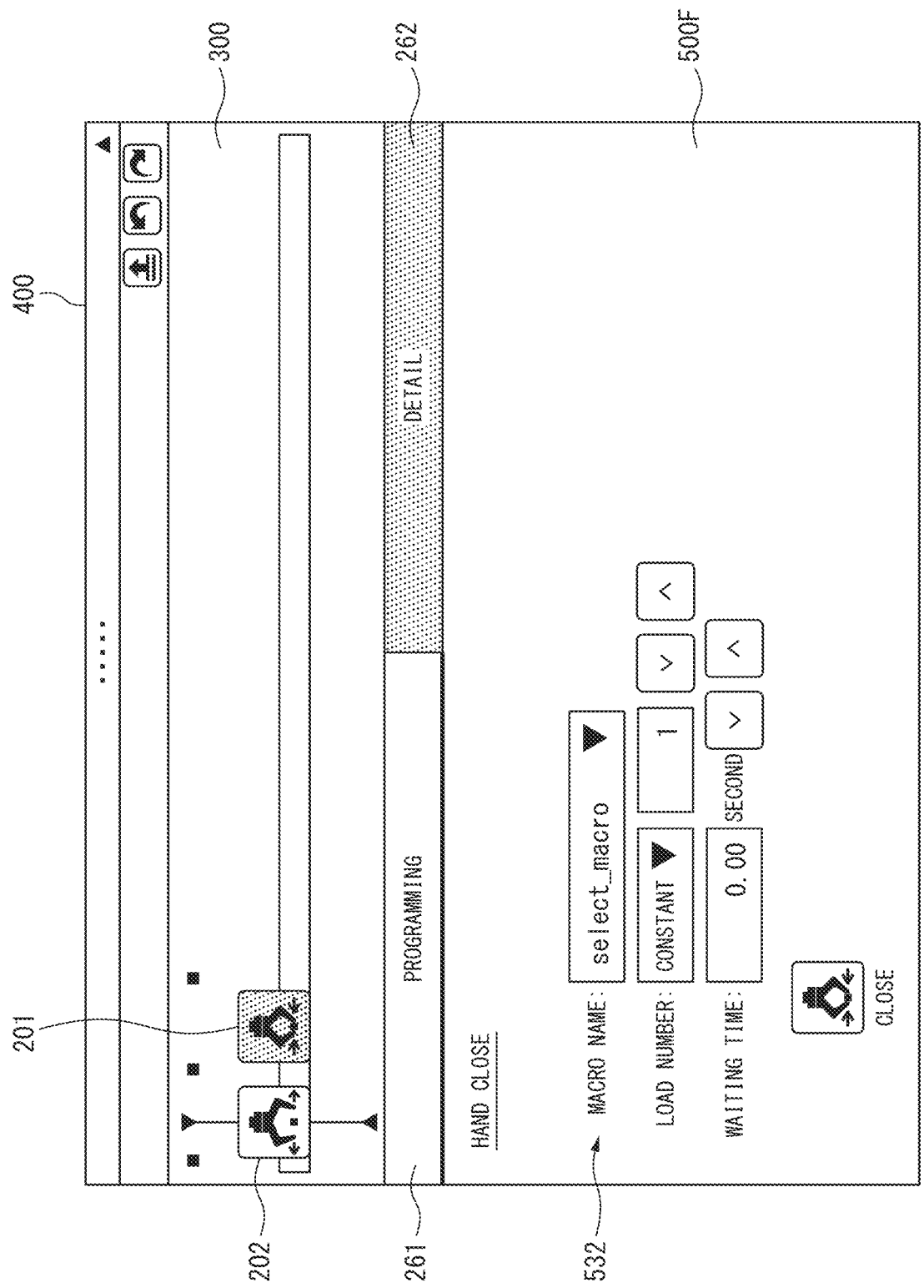
FIG. 10 is a diagram illustrating a detailed setting screen displayed on the lower portion of the screen when the detail tab is selected while a hand close icon is selected.

Next, with reference to FIGS. 9 and 10, an operation example when icons using the same hardware are extracted as icons having a relationship is illustrated. Herein, as an exemplification of the icons using the same hardware, a hand open icon 202 and a hand close icon 201 are adopted. It should be noted that FIGS. 9 and 10 illustrate, for convenience of description, a state where only the hand open icon 202 and the hand close icon 201 are arranged in the program creation region 300, but actual programming normally includes many icons in the program creation region 300, and the hand open icon 202 and the hand close icon 201 are arranged away from each other. The hand open icon 202 is an icon of a command for opening a hand. The hand close icon 201 is an icon of a command for closing the hand.

FIG. 9 illustrates a state where a detailed setting screen 500E of the hand open icon 202 is displayed on the lower portion of the screen by selecting the detail tab 262 while the hand open icon 202 arranged in the program creation region 300 is selected. FIG. 10 illustrates a state where a detailed setting screen 500F of the hand close icon 201 is displayed on the lower portion of the screen by selecting the detail tab 262 while the hand close icon 201 is selected.

As illustrated in FIG. 9, the hand open icon 202 includes, as detailed setting parameters, an input field (reference sign 531) for specifying a macro name of a macro command (sub-program) that needs to be executed, a load number for specifying a load, and a waiting time. Further, as illustrated in FIG. 10, the hand close icon 201 includes, as detailed setting parameters, an input field (reference sign 532) for specifying a macro name of a macro command that needs to be executed, a load number, and a waiting time. In the present example, both of the hand open icon 202 and the hand close icon 201 specify "select_macro" as a macro name. A program of a macro command of the macro name "select_macro" includes the number of an input/output apparatus indicating a hand device. Herein, it is assumed that an apparatus number of the hand device specified in the macro command of the hand open icon 202 and an apparatus number of the hand device specified in the macro command of the hand close icon 201 are common. Therefore, in this case, the hand open icon 202 and the hand close icon 201 operate the same hand device in cooperation with each other.

In this case, the relationship display creation unit 154 recognizes that the hand open icon 202 and the hand close 201 use the same hardware by referring to the programs of the macro commands of the icons as the detailed setting items, and determines that the icons have a relationship. In this way, icons having a mutual connection in regard to processing contents are appropriately extracted. In this way, by extracting a relationship between icons corresponding to a command for the same hand device, and performing display of the relationship, the user can instantly recognize the connection between the hand open icon 202 and the hand close icon 201 that operate the same hand device on the program creation screen 400, and can efficiently proceed with creation of a program.

Depending on a robot system, a plurality of hand devices may be mounted on one robot. For example, a configuration in which two hand devices (a hand #1 and a hand #2) are mounted on one robot is assumed. In such a case, command icons for two hand devices are mixed in a control program, but, according to the present embodiment, the relationship display creation unit 154 can extract a hand open icon and a hand close icon for the hand #1 as icons having a relationship, and can extract a hand open icon and a hand close icon for the hand #2 as icons having a relationship. Therefore, also in a situation where a plurality of hand devices are mounted on a robot system, icons having a relationship can be associated for each of the plurality of hand devices.

It should be noted that a hand device is described herein as an example of hardware used for a robot system, but icons using the same hardware can be extracted by a technique similar to the above-described technique in regard to various hardware apparatuses connected to a robot system other than a hand device.

Next, an example of display of a relationship performed by the relationship display creation unit 154 on icons determined as icons having a relationship will be described. Examples of relationship display performed by the relationship display creation unit 154 are indicated as follows.

(b1) An image representing the same identification symbol is added to icons having a relationship.
(b2) Icons having a relationship are displayed in such a way as to be more emphasized than another icon.
(b3) An image that connects icons having a relationship to each other is added.

Figure 11:
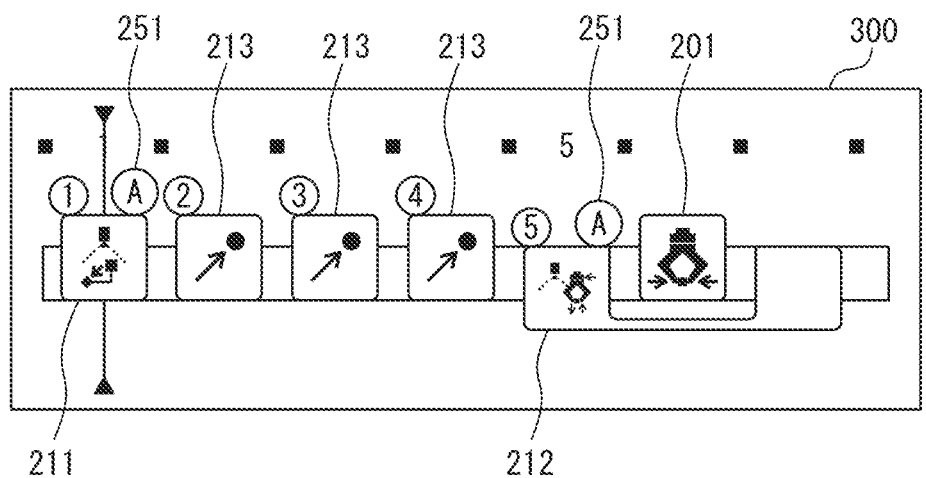
FIG. 11 is a diagram illustrating an example in which icons having a relationship are provided with the same identification symbol and displayed.

FIG. 11 is an example of displaying a relationship between icons by "(b1) An image representing the same identification symbol is added to icons having a relationship" described above. In FIG. 11, a state where the view icon 211 and the pick/arrange icon 212 are extracted as icons having a relationship among the icons 211, 213, 212, and 201 arranged in the program creation region 300 is assumed. In FIG. 11, an alphabet "A" (reference sign 251) with a circle is provided and displayed as the same identification symbol on the view icon 211 and the pick/arrange icon 212 having a relationship. Since the same identification symbol is provided and displayed on the view icon 211 and the pick/arrange icon 212, the user can visually instantly recognize that the icons have a relationship. It should be noted that numbers 1 to 5 with a circle being provided to each of the icons in FIG. 11 represents a number of a teaching point (the same also applies to other FIGS. 12 to 15).

Figure 12:
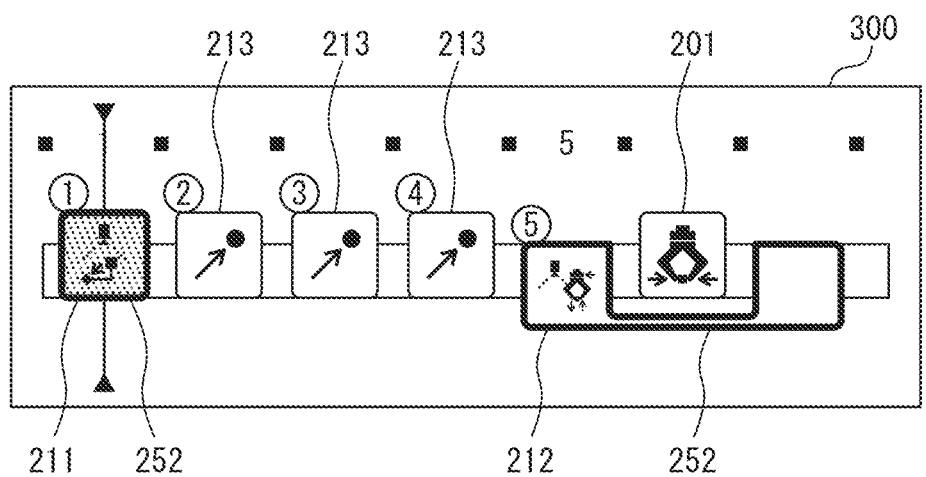
FIG. 12 is a diagram illustrating an example in which icons having a relationship are emphasized and displayed in a display manner of the same kind.

FIG. 12 is an example of displaying a relationship between icons by "(b2) Icon having a relationship are displayed in such a way as to be more emphasized than another icon" described above. In FIG. 12, a state where the view icon 211 and the pick/arrange icon 212 are extracted as icons having a relationship among the icons 211, 213, 212, and 201 arranged in the program creation region 300 is assumed. In FIG. 12, display frames (reference sign 252) of the same color are added to the view icon 211 and the pick/arrange icon 212, which are extracted as icons having a relationship, so that these icons are emphasized. In this way, the user can visually instantly recognize that the icons have a relationship.

Herein, the example of emphasizing the icons having a relationship by the frame of the same color is described, but various ways of emphasis in such a way as to set the same color for a color of the entire icons, represent the icons by the same pattern, and the like are possible in addition to the above-described example as a way of emphasizing the icons having a relationship. Alternatively, a way of relatively emphasizing the icons having a relationship in such a way as to tone down or gray out an icon other than the icons having a relationship is also possible. Further, the ways may be used in combination.

Figure 13:
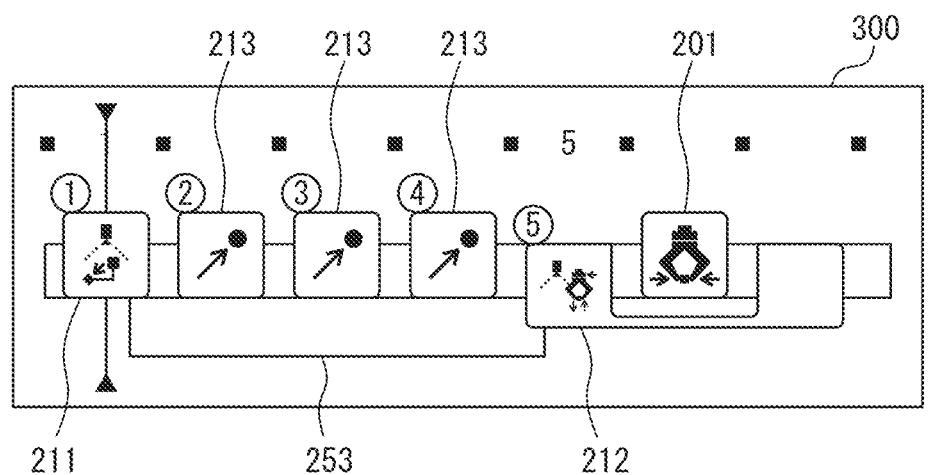
FIG. 13 is a diagram illustrating an example in which a relationship is expressed by coupling and displaying icons having the relationship.

FIG. 13 is an example of displaying a relationship between icons by "(b3) An image that connects icons having a relationship to each other is added" described above. Herein, as an exemplification, a display example in which the view icon 211 and the pick/arrange icon 212 are extracted as icons having a relationship is indicated. In FIG. 13, a state where the view icon 211 and the pick/arrange icon 212 are extracted as icons having a relationship among the icons 211, 213, 212, and 201 arranged in the program creation region 300 is assumed. In FIG. 13, the view icon 211 and the pick/arrange icon 212 extracted as icons having a relationship are connected by a line 253. In this way, it is obvious that the view icon 211 and the pick/arrange icon 212 are related.

Figure 14:
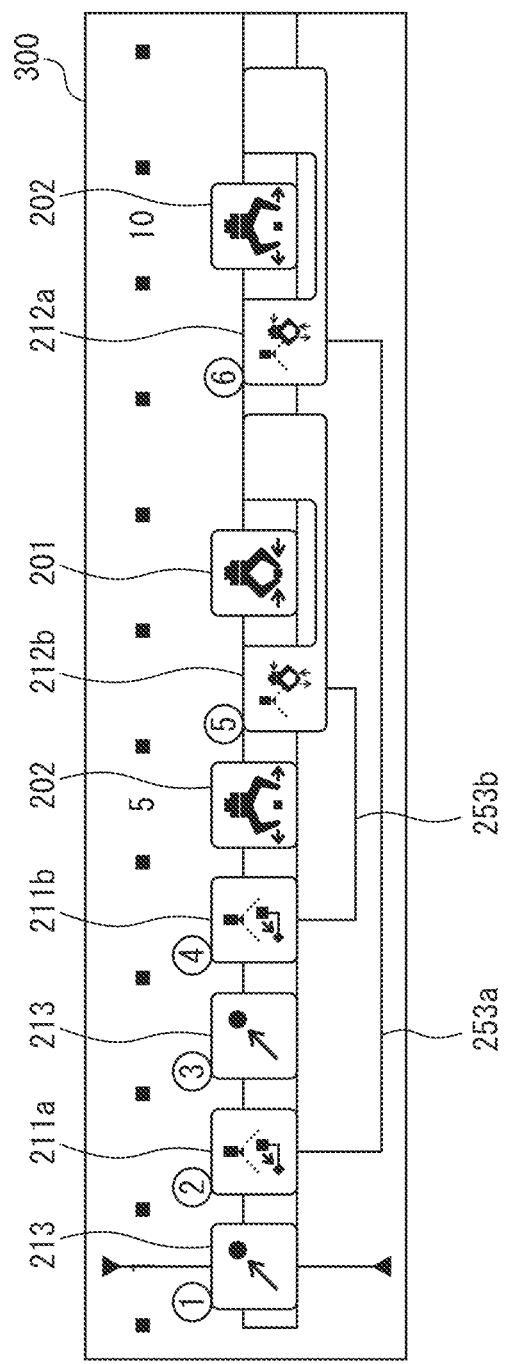
FIG. 14 is a diagram illustrating an example in which a mutual relationship between icons is displayed when a plurality of the same icons are mixed.

FIG. 14 illustrates a display example of a relationship when a plurality of the same icons are present in the program creation region 300. Specifically, in FIG. 14, it is assumed that a pair of a view icon 211a and a pick/arrange icon 212a is extracted as icons having a relationship since the pair refers to a register of the same number (for example, No. 1 of a vision register) as a vision register of an output destination of a detection result, and a pair of a view icon 211b and a pick/arrange icon 212b is extracted as icons having a relationship since the pair refers to a register of the same number (for example, No. 2 of a vision register) as a vision register of an output destination of a detection result.

The relationship display creation unit 154 displays a connection between the view icon 211a and the pick/arrange icon 212a by a line 253a, and displays a connection between the view icon 211b and the pick/arrange icon 212b by a line 253b. In this way, the user can instantly recognize that the view icon 211a and the pick/arrange icon 212a have a connection in regard to the processing, and simultaneously instantly recognize that the view icon 211b and the pick/arrange icon 212b have a connection in regard to the processing.

In this way, even in a situation where a plurality of the same icons (pairs of the same icons) are present in a program, the technique for displaying a relationship according to the present embodiment can appropriately establish a relationship between icons having a connection in regard to the processing and allow a user to recognize the relationship.

Various examples of a timing at which the relationship display creation unit 154 extracts icons having a relationship and displays the relationship are possible. For example, examples such as (c1) to (c4) described below are possible.

(c1) The extraction and display are performed in response to a predetermined operation by a user (for example, a user operation of selecting one of icons arranged in the program creation region 300).

(c2) The extraction and display are performed every time an icon is arranged in the program creation region.

(c3) The extraction and display are performed every time detailed setting is performed on an icon arranged in the program creation region.

(c4) Two or more of (c1) to (c3) described above are used in combination.

It should be noted that, FIG. 12 illustrates, as an exemplification, a state where, when the view icon 211 is selected, the relationship display creation unit 154 displays a relationship between the view icon 211 and the pick/arrange icon 212.

It should be noted that, when relationships are extracted for all icons arranged in the program creation region 300 and the relationships are displayed, a case where a screen becomes complicated and difficult to see is also assumed. In order to avoid such complicatedness of display and perform display of a relationship being intended by a user, the relationship display creation unit 154 may display a relationship by any of (d1) to (d3) below.

(d1) When a user selects any of icons arranged in the program creation region 300, a relationship of only the selected icon (only the selected icon and an icon having a relationship with the selected icon) is displayed.

(d2) A relationship of only an icon belonging to a category specified by a user in advance (icon belonging to a category specified in advance and having a relationship) is displayed.

(d3) When a user selects any of icons arranged in the program creation region 300, a relationship of only an icon in a category to which the selected icon belongs (icon belonging to a category to which the one selected icon belongs and having a relationship) is displayed.

The specification by the user in (d2) described above includes a specification of a category by various user operations. The category in (d2) and (d3) described above classifies icons of the same kind, and, for example, categorization as follows may be applied. In this case, the icon data storage unit 156 categorizes and stores data about icons as in Table 1 below.

TABLE 1

| CATEGORY | ICON |
| --- | --- |
| OPERATION | LINEAR MOVEMENT ICON, EACH AXIS MOVEMENT ICON, ARC MOVEMENT ICON, HAND OPEN ICON, HAND CLOSE ICON |
| CONTROL | JUMP ICON, LABEL ICON |
| VISION | VIEW ICON, PICK/ARRANGE ICON |

In Table 1 described above, a category "operation" includes icons related to an operation of a robot, a hand, and the like, a category "control" includes icons related to program control, such as a jump and the like, and a category "vision" includes icons related to a visual detection function. By performing categorization in such a way that icons of the same kind belong to the same category as in Table 1 described above, for example, when a user puts a cursor on an icon belonging to the category "operation" and selects the icon, a relationship of only an icon belonging to the category "operation" of the selected icon is displayed.

By displaying a relationship of only an icon belonging to a category selected by a user in such a manner, complicatedness of the program creation screen 400 due to display of a relationship can be avoided, and the relationship can also be displayed in a manner intended by the user.

There may be a case where the relationship display creation unit 154 is not able to extract a relationship due to, for example, a fact that a user fails to input or makes a mistake to input a parameter setting item in regard to an icon that originally needs to be extracted as an icon having a relationship. For example, it is a case where there is a mistake in an input of a register name of an output destination of a detection result by a user in regard to the view icon 211 and the pick/arrange icon 212, and the register name of the output destination of the detection result of the view icon 211 and the register name of the output destination of the detection result of the pick/arrange icon 212 do not match. When the relationship display creation unit 154 cannot extract a relationship in such a manner, the relationship display creation unit 154 may perform warning display of the failure in extraction for an icon whose relationship cannot be extracted. As an example of the warning display, notification of a warning or an error message by a pop-up manner and the like, emphasized display of an icon, and other various examples are possible. In this way, a user can instantly recognize an error in programming.

Figure 15:
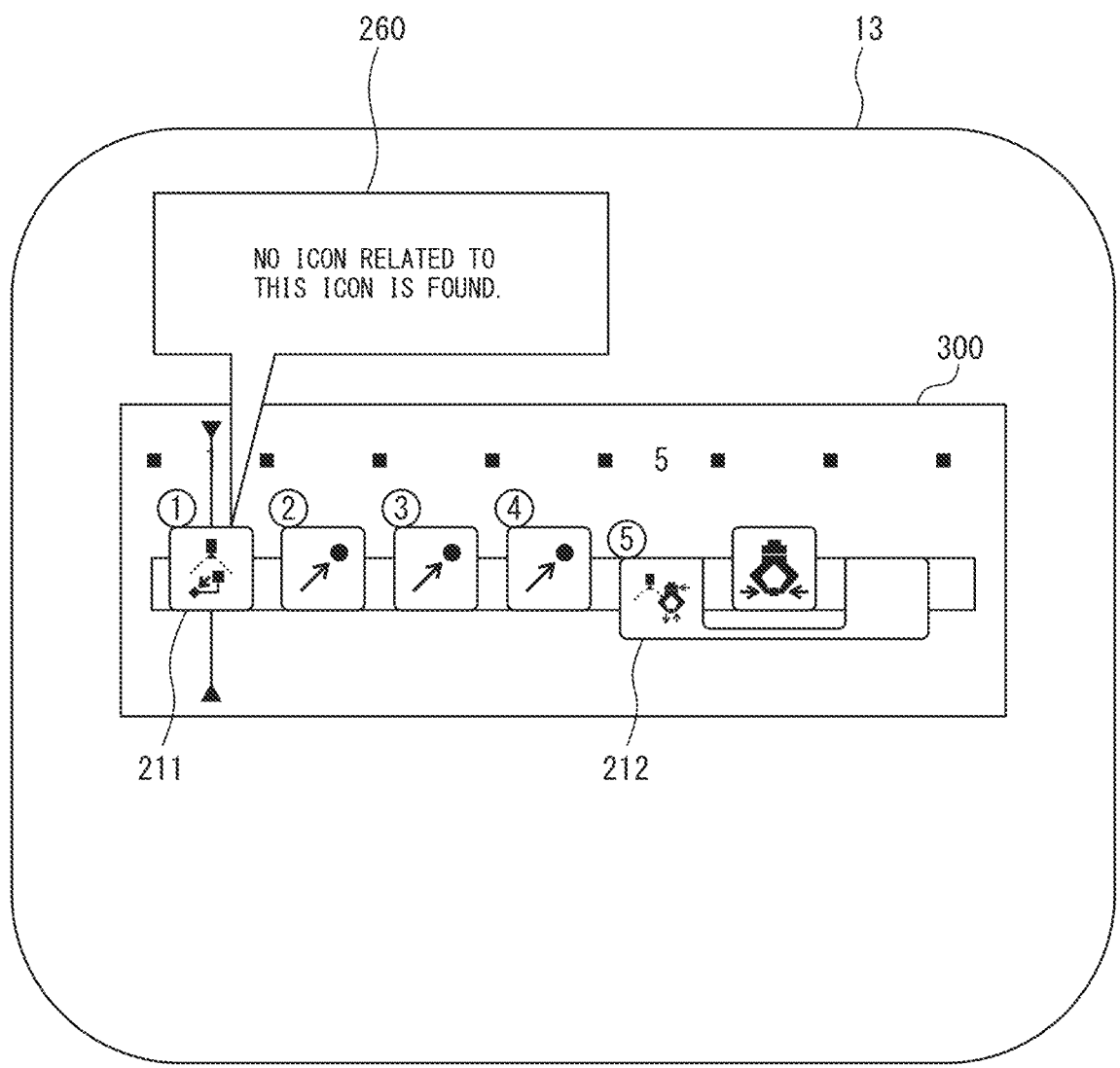
FIG. 15 is a diagram illustrating an example of warning display when an icon having a relationship with an icon is not found.

FIG. 15 illustrates, as an exemplification, an example in which, when the relationship display creation unit 154 cannot find an icon having a relationship with the view icon 211 while illustrated icons are arranged in the program creation region 300, a warning message of the failure to find the icon is displayed on a pop-up screen 260. When such warning display is performed, for example, a user opens a detailed setting screen of the view icon 211 or the pick/arrange icon 212, can confirm whether there is an error in a register number of an output destination of a detection result, and can quickly correct a program.

As described above, according to the present embodiment, a relationship between icons arranged in a predetermined region of a program creation screen can be visually recognized, and creation of a program can efficiently be performed.

The present invention has been described above by using the typical embodiments, but it will be understood by those of ordinary skill in the art that changes, other various changes, omission, and addition may be made in each of the embodiments described above without departing from the scope of the present invention.

Distribution of the functions of the robot controller 50 and the teach pendant 10 in the functional block diagram illustrated in FIG. 3 is an exemplification, and various manners can be adopted for distribution of the functions assigned to the robot controller 50 and the teach pendant 10. For example, a part of the function included in the robot controller 50 in FIG. 3 may be assigned to the teach pendant 10.

Alternatively, all of the functions as the control program creation unit 152 being assigned to the robot controller 50 may be assigned to the teach pendant 10. In this case, the teach pendant 10 may function as the teaching device 40 (i.e., a program creation device) alone. Further, in this case, various information processing devices such as a tablet terminal, a smartphone, and a personal computer may be used as the teaching device 40.

The configuration of the teaching device described in the above embodiment can be applied to programming using an icon in not only an industrial robot, but also a machine tool and other various industrial machines.

The functional block of the teaching device illustrated in FIG. 3 may be achieved by executing various types of software stored in a storage device by the CPU of the apparatus constituting the teaching device, or may be achieved by a configuration in which hardware such as an application specific integrated circuit (ASIC) is a main body.

REFERENCE SIGNS LIST

1 Target object
2 Worktable
10 Teach pendant
11 Processor
12 Memory
13 Display unit
14 Operating unit
15 Input/output interface
20 Visual sensor controller
30 Robot
33 Hand
40 Teaching device
50 Robot controller
51 Processor
52 Memory
53 Input/output interface
54 Operating unit
70 Visual sensor
100 Robot system
151 Robot operation control unit
152 Control program creation unit
153 Icon control unit
154 Relationship display creation unit
155 Screen display creation unit
156 Icon data storage unit
200 Icon display region
261 Programming tab
262 Detail tab
300 Program creation region
400 Program creation screen
500A, 500B, 500C, 500D, 500E, 500F Detailed setting screen

The invention claimed is:

1. A teaching device for performing program creation by an icon representing a function constituting a control program of an industrial machine, the teaching device comprising:
   a screen display creation unit configured to generate a program creation screen including a predetermined region for creating the control program by arranging a plurality of the icons; and
   a relationship display creation unit configured to extract two or more icons having a mutual relationship in regard to processing contents among the plurality of icons arranged in the predetermined region, based on information about each of the plurality of icons, and perform display in which the relationship between the two or more extracted icons can be visually recognized.

2. The teaching device according to claim 1, wherein the relationship display creation unit extracts, as icons regarded to have the relationship, two or more icons that satisfy at least any of conditions of
   (1) using the same data, and
   (2) using the same hardware
among the plurality of icons arranged in the predetermined region.

3. The teaching device according to claim 1, wherein the relationship display creation unit adds an image representing the same identification symbol to two or more icons having the relationship in the predetermined region.

4. The teaching device according to claim 1, wherein the relationship display creation unit displays two or more icons having the relationship in such a way that the two or more icons are more emphasized than another icon in the predetermined region.

5. The teaching device according to claim 1, wherein the relationship display creation unit adds an image that connects two or more icons having the relationship in the predetermined region.

6. The teaching device according to claim 1, wherein the relationship display creation unit performs display in which the relationship can be visually recognized, in response to a selection operation being performed on one of the plurality of icons arranged in the predetermined region.

7. The teaching device according to claim 6, wherein the relationship display creation unit performs display in which the relationship can be visually recognized, only for the one selected icon and one or more icons having the relationship with the one icon.

8. The teaching device according to claim 1, further comprising an icon data storage unit configured to store the information about the plurality of icons in such a manner that the information is categorized into a plurality of categories, wherein the relationship display creation unit performs display in which the relationship can be visually recognized, for two or more icons belonging to a category specified in advance and having the relationship among the plurality of icons arranged in the predetermined region.

9. The teaching device according to claim 8, wherein the relationship display creation unit performs, in response to a selection operation being performed on one of the plurality of icons arranged in the predetermined region, display in which the relationship can be visually recognized, for two or more icons belonging to a category to which the one selected icon belongs and having the relationship among the plurality of icons arranged in the predetermined region.

10. The teaching device according to claim 1, wherein the relationship display creation unit performs warning display for an icon with which no icon has the relationship, among the plurality of icons arranged in the predetermined region.

* * * * *